(12) United States Patent
Meredith

(10) Patent No.: US 11,944,852 B2
(45) Date of Patent: Apr. 2, 2024

(54) EMERGENCY FIREFIGHTING CLIMBING DEVICE AND SYSTEM

(71) Applicant: John H Meredith, Pelham, AL (US)

(72) Inventor: John H Meredith, Pelham, AL (US)

( * ) Notice: Subject to any disclaimer, the term of this patent is extended or adjusted under 35 U.S.C. 154(b) by 0 days.

(21) Appl. No.: 17/879,139

(22) Filed: Aug. 2, 2022

(65) Prior Publication Data

US 2024/0042245 A1  Feb. 8, 2024

(51) Int. Cl.
| | |
|---|---|
| A62B 3/00 | (2006.01) |
| B05B 15/60 | (2018.01) |
| B05B 15/625 | (2018.01) |
| B05B 15/63 | (2018.01) |
| F16L 3/10 | (2006.01) |

(52) U.S. Cl.
CPC ............... *A62B 3/00* (2013.01); *B05B 15/60* (2018.02); *B05B 15/625* (2018.02); *B05B 15/63* (2018.02); *F16L 3/1033* (2013.01)

(58) Field of Classification Search
CPC ......... A62B 3/00; B05B 15/625; B05B 15/60; B05B 15/63; F16L 3/1033
See application file for complete search history.

(56) References Cited

U.S. PATENT DOCUMENTS

| | | | | |
|---|---|---|---|---|
| 208,944 A | * | 10/1878 | Wohlmann | A62B 1/20 182/51 |
| 1,016,281 A | * | 2/1912 | Lundquist | B05B 15/625 239/588 |
| 1,058,090 A | * | 4/1913 | Nelson | B05B 15/622 248/85 |
| 1,058,926 A | * | 4/1913 | Toole | B65G 7/12 294/16 |
| 1,091,277 A | * | 3/1914 | Bloom | A63B 27/02 182/134 |
| 1,482,745 A | * | 2/1924 | Heid | A63B 27/02 482/76 |
| 1,583,772 A | * | 5/1926 | Blaw | A62C 31/24 248/77 |
| 1,631,874 A | * | 6/1927 | Lasher | B05B 15/625 248/81 |
| 1,667,342 A | * | 4/1928 | Blaw | A62C 31/28 248/82 |
| 1,703,856 A | * | 2/1929 | McKeag | B25B 13/02 248/77 |
| 1,784,535 A | * | 12/1930 | Osterby | B25F 1/00 7/138 |

(Continued)

FOREIGN PATENT DOCUMENTS

EE  01283 U1 * 3/2015

*Primary Examiner* — John Fitzgerald
*Assistant Examiner* — Tania Courson
(74) *Attorney, Agent, or Firm* — CHRISTOPHER R. GANTER, LLC

(57) ABSTRACT

A firefighter safety system and tools purposed for extracting oneself from out of a burning and smoke infested compartment of a building structure where the floor has caved in. Disclosed is a hand tool and foot tool that a firefighter can use alongside with a pressurized fire hose whereby the hand tool and foot tool can engage the fire hose in frictional contact whereby the firefighter can pull with their hand on the tool and push with their foot on the foot tool until they extricated themselves from dangerous conditions.

17 Claims, 7 Drawing Sheets

(56) References Cited

U.S. PATENT DOCUMENTS

| | | | | | |
|---|---|---|---|---|---|
| 1,809,550 | A * | 6/1931 | Farrar | | B05B 15/625 |
| | | | | | 248/80 |
| 3,019,852 | A * | 2/1962 | Soderberg | | A63B 27/04 |
| | | | | | 182/134 |
| 3,121,471 | A * | 2/1964 | Soderberg | | A63B 27/04 |
| | | | | | 182/134 |
| 3,708,196 | A * | 1/1973 | Snell | | B65G 7/12 |
| | | | | | 294/92 |
| 4,225,013 | A * | 9/1980 | Sample | | A63B 27/02 |
| | | | | | 182/187 |
| 4,856,834 | A * | 8/1989 | Lancaster | | B65G 7/12 |
| | | | | | 169/46 |
| 5,407,025 | A * | 4/1995 | Nickel | | E06C 1/381 |
| | | | | | 182/100 |
| 5,515,593 | A * | 5/1996 | Eagler | | B67D 7/42 |
| | | | | | 446/385 |
| 6,447,033 | B1 * | 9/2002 | Konczak | | B65G 7/12 |
| | | | | | 294/92 |
| 7,181,995 | B2 * | 2/2007 | Rider | | H01H 31/006 |
| | | | | | 81/3.8 |
| D553,482 | S * | 10/2007 | Magalhaes | | D8/371 |
| 7,874,034 | B1 * | 1/2011 | Mack | | B25B 13/02 |
| | | | | | 7/138 |
| 8,113,094 | B1 * | 2/2012 | Brackbill | | B25B 15/00 |
| | | | | | 81/463 |
| 8,348,317 | B1 * | 1/2013 | Bird | | A45F 3/14 |
| | | | | | 294/902 |
| 9,175,790 | B2 * | 11/2015 | Schiller | | F16L 3/02 |
| 9,873,005 | B1 * | 1/2018 | Williams | | A45F 3/14 |
| 10,751,558 | B2 * | 8/2020 | Young | | F16L 23/06 |
| D944,064 | S * | 2/2022 | Hunkins | | D8/14 |
| 2004/0174027 | A1 * | 9/2004 | Bennett | | B25B 9/00 |
| | | | | | 294/26 |
| 2008/0216619 | A1 * | 9/2008 | Brackbill | | B25B 15/00 |
| | | | | | 81/463 |
| 2017/0144007 | A1 * | 5/2017 | Kelley | | A62C 31/28 |
| 2022/0168881 | A1 * | 6/2022 | Kessler | | B25G 1/102 |

* cited by examiner

EMERGENCY FIREFIGHTING CLIMBING DEVICE AND SYSTEM

FIELD OF THE INVENTION

The present invention relates to a set of tools that allows a firefighter to escape and climb out of an area of a burning structure where there is no other route of escape.

BACKGROUND OF THE INVENTION

Fire fighting personnel by the very nature of their jobs put themselves in great danger by entering burning structures without knowledge of the hazards and conditions that have arisen due to the structure on fire. Among many hazards fire fighters encounter is when they enter a room whereby there is a fire below the room that has burned the wood of the floor and causes a firefighter to fall through the floor into smoke and fire filled space. Apart from the sudden shock of falling through a floor and potential bodily injury that the fall may cause, it is highly likely that they have dropped into a smoke and fire filled space that leads immediately to disorientation and the inability to ascertain a way out of the space due to unfamiliarity, smoke and a fire that might block any exits. When a firefighter drops through a floor, his/her fellow firefighters must do anything they can to pull the firefighter up and out of the dangerous space. However, there is often not a suitable way, device or method to quickly get the firefighter up and out of the burning space in such a way that a device such as a ladder can be easily carried and deployed by a team member. What is needed in the art is a tool and system that every member of a firefighting team can carry on their possession in a compact manner such that if any one member of the team falls through a floor that team member will have the means to climb out. What is further needed in the art is a tool that can use a pressurized fire hose that the firefighters are carrying to allow a firefighter to climb the hose and out of the burning space. What is also needed in the art is a tool that is easy and intuitive to use in disorienting situations.

SUMMARY OF THE INVENTION

The firefighting climbing device and system comprises a hand tool and a foot tool. The hand tool is adapted to latch onto a pressurized fire hose and the foot tool is adapted to receive a firefighter's boot in locked position while also adapted to latch on to a pressurized firehose. The hand tool and the foot tool both have beveled teeth oriented in a substantially square shaped or substantially U-shaped frame in such a way as to grasp the fire hose and by using gravity, friction and the weight of the firefighter to maintain fixed position on the fire hose. The firefighter grasps the hand tool with one of their hands and inserts it onto the fire hose as high as they can and then inserts the foot tool on and around the firehose and steps up onto the fire hose. The firefighter then slides the hand tool along the hose as far as they can and pulls downward as the firefighter repositions the foot tool higher up the hose and repeats this process until they have made it out of the burning space.

DETAILED DESCRIPTION

Figure 1:
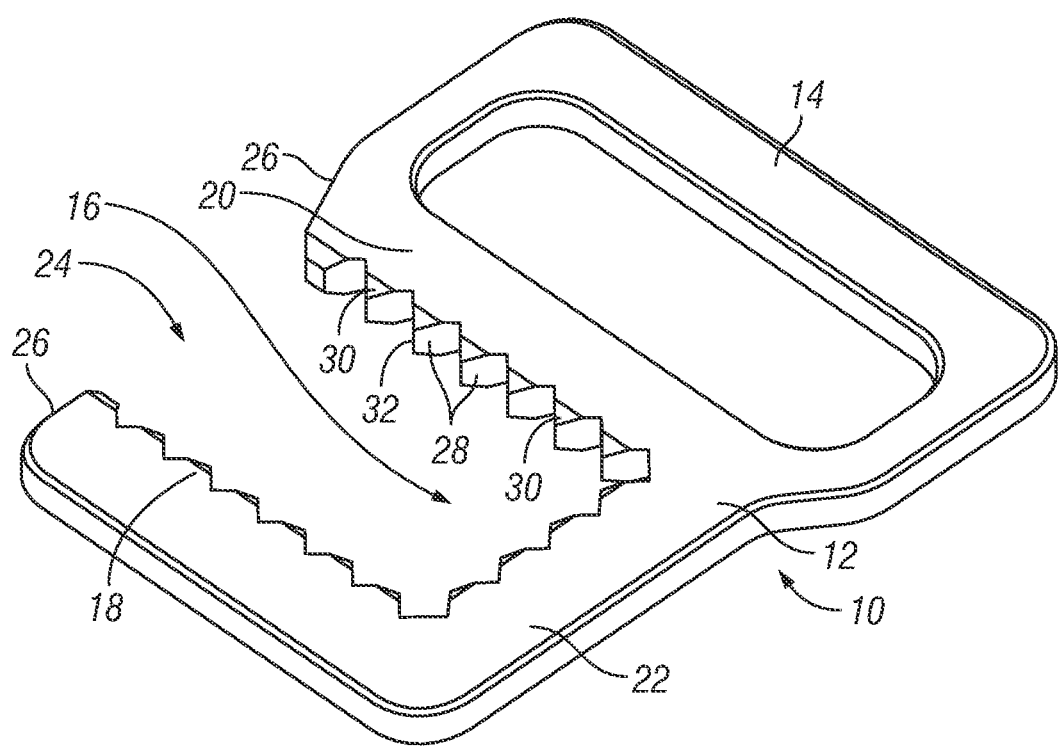
FIG. 1 is a perspective view of the hand tool.
Figure 2:
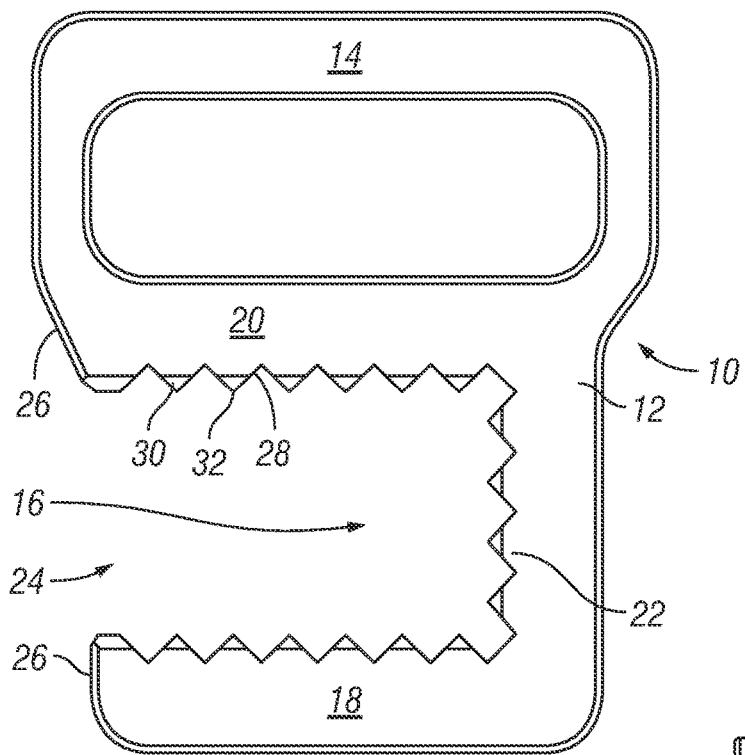
FIG. 2 is a top plan view of the hand tool.
Figures 3, 4:
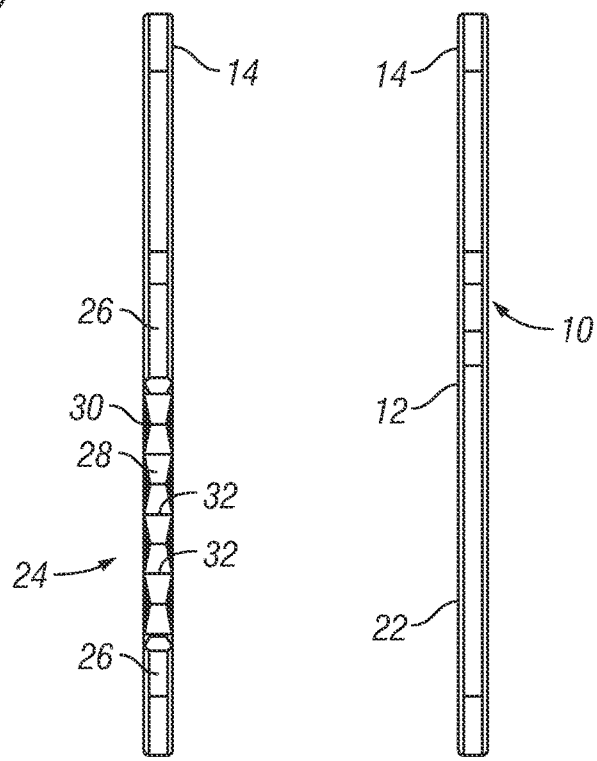
FIG. 3 is a left side elevation of the hand tool.
FIG. 4 is a right side elevation of the hand tool.
Figure 5:
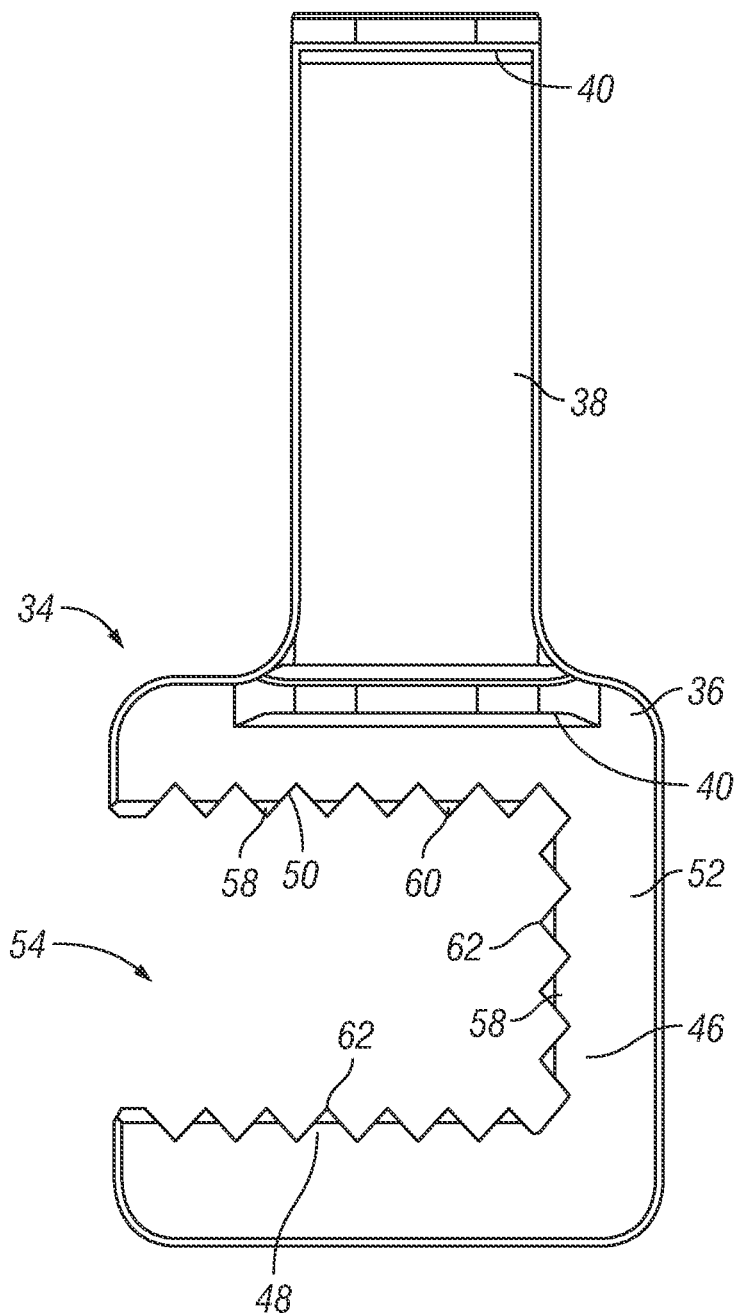
FIG. 5 is a top plan view of the foot tool.a
FIG. 6 is a perspective view of the foot tool.
Figure 6:
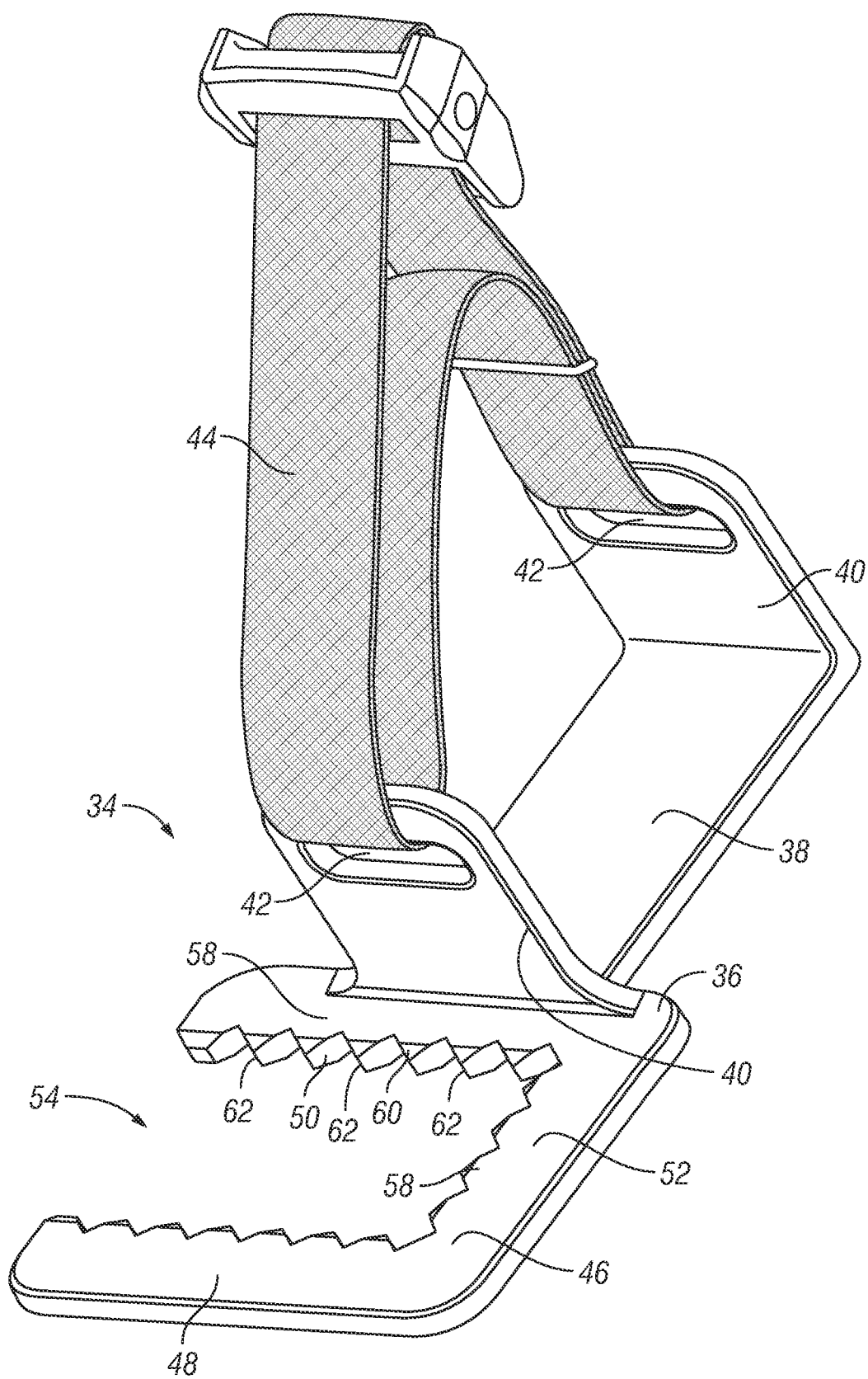
Figure 7:
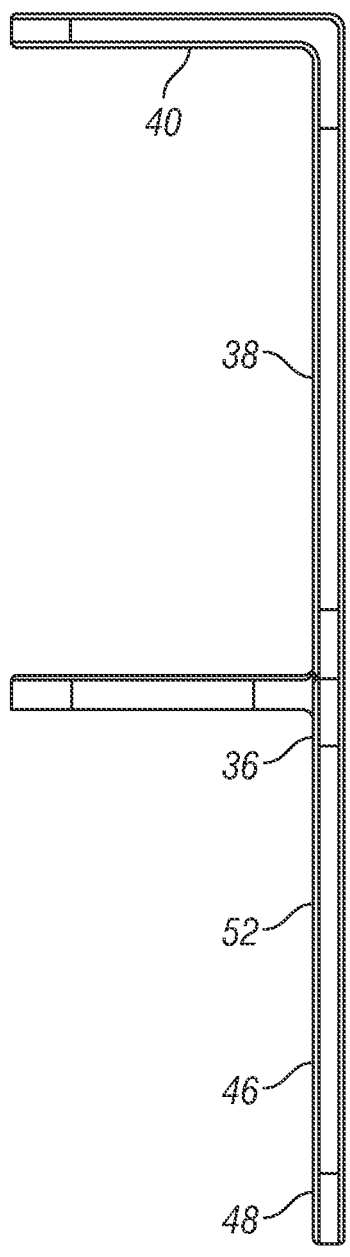
FIG. 7 is a right side elevation of the foot tool.
Figure 8:
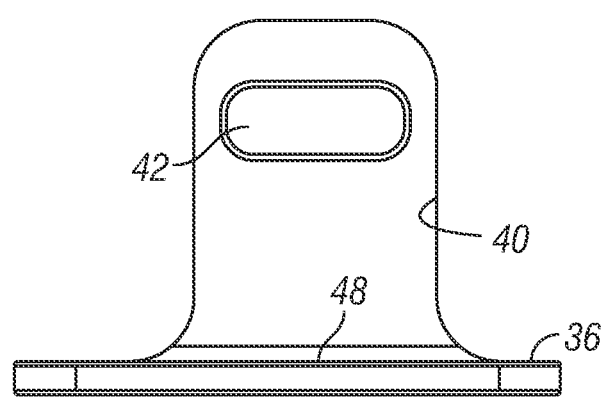
FIG. 8 is a bottom side elevation of the foot tool.

Referring now to FIGS. 1-4 there is shown a firefighter safety hand tool 10 having a metal frame 12 wherein on one end of the hand tool 10 there is a hand grip 14 and on the other end of the hand tool 10 there is a firehose clamping frame 16. The clamping frame 16 is generally rectangular in shape but also be in a general U shape configuration whereby the clamping frame 16 has a inner left edge 18, an inner right edge 20, and an inner rear edge 22. There is also a firehose opening 24 of the clamping frame 16 of the hand tool 10. On either side of the firehose opening 24 there are rounded edges 26 that allow easy entrance of the fire hose into the clamping frame 16. The hand tool 10 ideally would be made of rigid metal such as steel, iron, aluminum, titanium, a metal alloy or other suitable metal materials. The thickness of the hand tool is generally about 0.25 inches thick but can vary according to a firefighter needs. Located on the inner left edge 18, the inner right edge 20, and the inner rear edge 22 of the clamping frame 16 are a plurality of teeth 28 lined up next to each other on the inner left edge 18, the inner right edge 20 and the inner rear edge 22. The teeth 28 are generally triangular in shape and have a bevel 30 on a top surface of the teeth 28 and on a bottom surface of the teeth 28. Each tooth has vertical edge 32 on its most terminus point. This allows the hand tool 10 teeth 28 to provide some frictional bite on a firehose without actually puncturing a pressurized firehose. If the teeth 28 terminated into direct points and there is a distinct possibility that the firehose could be punctured. The teeth in one embodiment are spaced 0.5 inches apart from each other but that distance can vary dictated according to the size of the firehose being used. Dimensionally, in one embodiment, the hand tool is 5.5 inches wide by 6.38 long, but these distances can vary based on the size of the firehose used and the weight of a particular firefighter.

Dimensionally in one embodiment, the foot tool is about 4.5 inches wide at the clamping frame 46 and 9.25 inches long although varying dimensions based on the width of the firehose in use is obviously available for the foot tool 34. The optimum width in the firehose opening 54 of the foot tool 34 is around 2.13 inches between the inner left edge 48 and the inner right edge 50. The depth of the firehose opening 54 back to the rear inner edge of the clamping frame 46 is around 3.5 inches, however, this depth is adjustable depending on the firehose that a particular fire crew is using. These dimensions are not absolute but are an optimum embodiment for firehoses that are 1.5 inches in width which are widely used in fighting fires in interior structures. Firehoses range in the widths of 1.5 inches up to 4 inches and foot tool 34 could be adjusted and manufactured to fit these widths.

Referring now to FIGS. 5-8, there is shown a foot tool 34 that is complementary in use with the hand tool 10. The foot tool 34 has a metal frame 36 and is made of a metal material such as is mentioned in paragraph above. The foot tool has a foot bracket 38 further comprising two vertical side plates 40 that are perpendicular to the foot bracket plate 38.

Located in the upper region of each vertical side plates 40 are slots 42 that are purposed for receiving an adjustable foot strap 44 that a firefighter can insert their foot into and allows for cinching down of the foot to the foot bracket plate 38 and the vertical side plates 40 via a quick cinch buckle located on the adjustable strap. In one embodiment the foot strap 44 is highly reflective on its outer surface such that it allows a firefighter to locate the foot tool 34 in dark and smoky conditions such that they can install there foot therein. On the opposite end of the foot tool 34 is a clamping frame 46. The clamping frame 46 is generally rectangular in shape but also be in a general U shape configuration whereby the clamping frame 46 has a inner left edge 48, an inner right edge 50, and an inner rear edge 52. There is also a firehose opening 54 of the clamping frame 34 of the foot tool 34. On either side of the firehose opening 54 there are rounded edges 56 that allow easy entrance of the fire hose into the clamping frame 16. The foot tool 34 ideally would be made of rigid metal such as steel, iron, aluminum, titanium, a metal alloy or other suitable metal materials. Located on the inner left edge 48, the inner right edge 50, and the inner rear edge 52 of the clamping frame 46 are a plurality of teeth 58 lined up next to each other on the inner left edge 48, the inner right edge 50 and the inner rear edge 52. The teeth 58 are generally triangular in shape and have a bevel 60 on a top surface of the teeth 58 and on a bottom surface of the teeth 58. Each tooth has a vertical edge 62 on their most terminus point. This allows the foot tool 34 teeth 58 to provide some frictional bite on a firehose without actually puncturing a pressurized firehose. If the teeth 58 terminated into direct points and there is a distinct possibility that the firehose could be punctured. The teeth of the foot tool 34 are spaced generally about 0.5 inches away from each other but that distance can vary based on the size of the firehose being used. The thickness of the foot tool 34 is generally inches but can be thicker to account for firehose size and firefighter weight.

Figure 9:
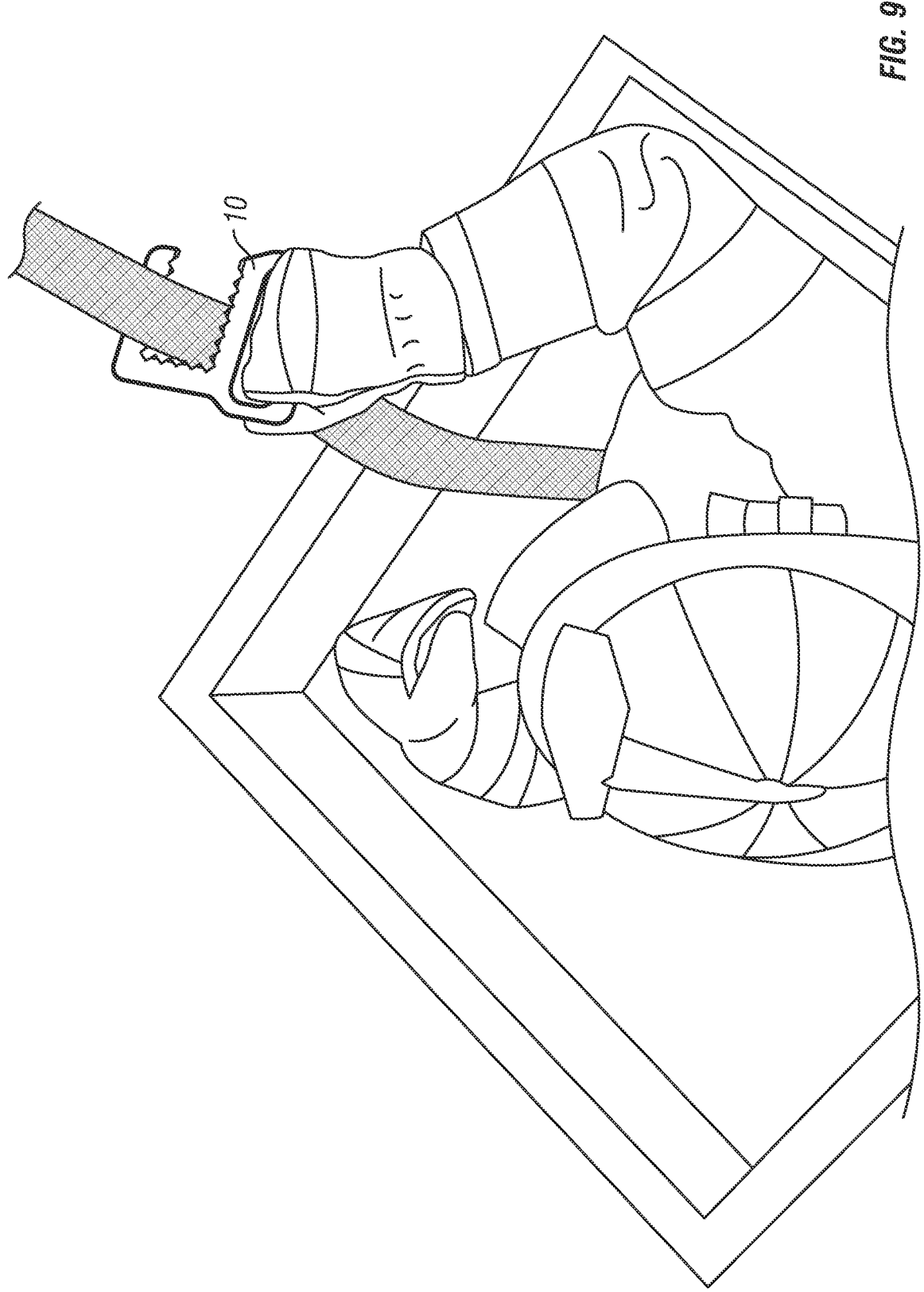
FIG. 9 is a top perspective view of a firefighter using the hand tool.
Figure 10:
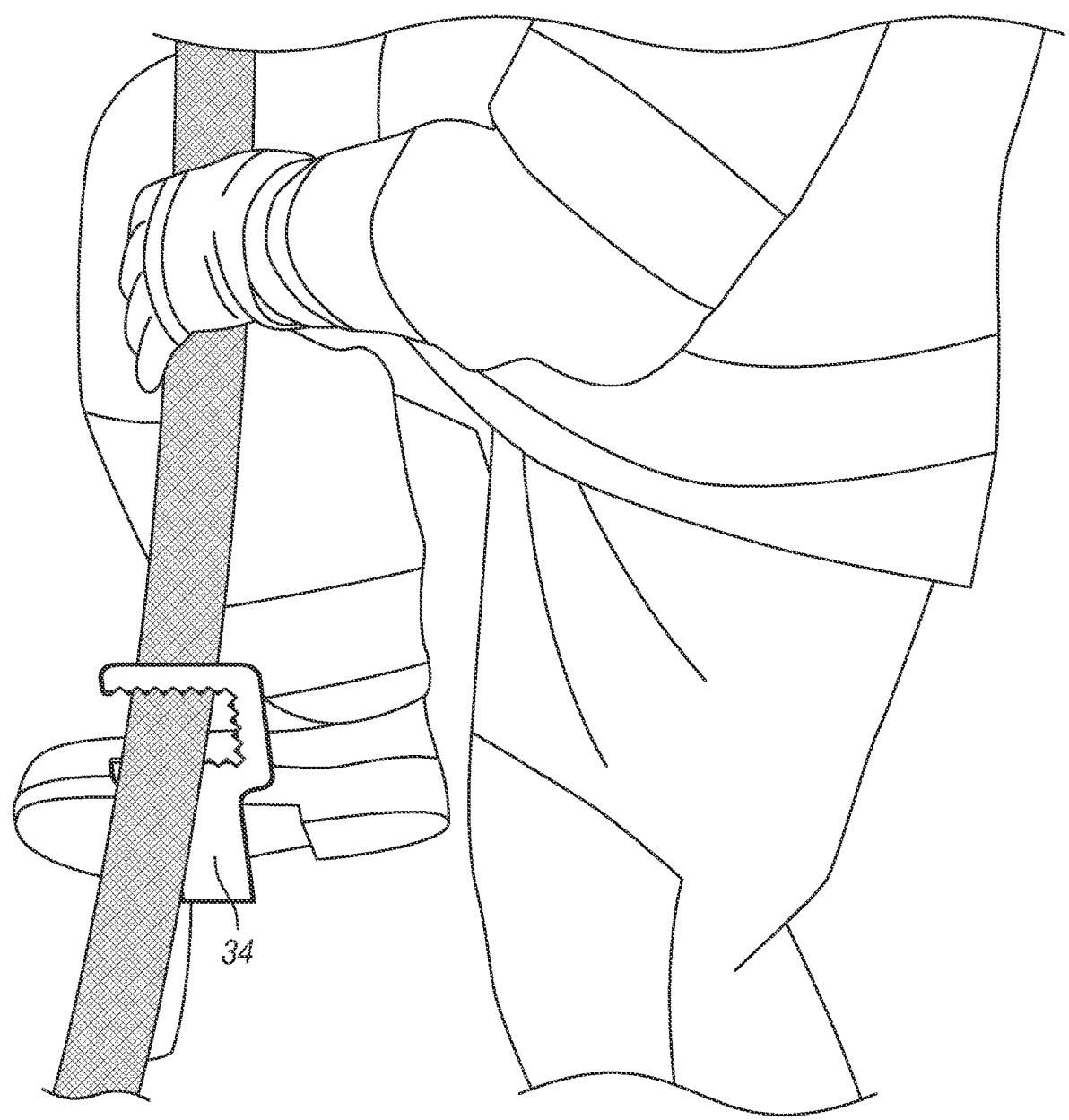
FIG. 10 is a perspective view of a firefighter using the foot tool.

Referring now to FIGS. 9-10 there is shown he firefighting climbing device and system comprising a hand tool 10 and a foot tool 34. In use, the hand tool 10 is adapted to latch onto a pressurized fire hose and the foot tool 34 is adapted to receive a firefighter's boot in locked position while also adapted to latch on to a pressurized firehose. The hand tool 10 and the foot tool 34 both have beveled teeth oriented in a substantially square shaped or substantially U-shaped frame in such a way as to grasp the fire hose and by using gravity, friction and the weight of the firefighter to maintain fixed position on the fire hose. The firefighter grasps the hand tool 10 with one of their hands and inserts it onto the fire hose as high as they can and then inserts the foot tool 34 on and around the firehose and steps up onto the fire hose. The firefighter then slides the hand tool along the hose as far up the firehose as they can and pulls downward and torques the hand tool 10 clamping frame 16 against the firehose as the firefighter repositions the foot tool 34 higher up the firehose and pushes downward onto the firehose and torques the foot tool 34 clamping frame 46 against the firehose and steps up the firehose and repeats this process until they have made it out of the burning space.

The principles, embodiments, and modes of operation of the present invention have been set forth in the foregoing specification. The embodiments disclosed herein should be interpreted as illustrating the present invention and not as restricting it. The foregoing disclosure is not intended to limit the range of equivalent structure available to a person of ordinary skill in the art in any way, but rather to expand the range of equivalent structures in ways not previously contemplated. Numerous variations and changes can be made to the foregoing illustrative embodiments without departing from the scope and spirit of the present invention.

ENUMERATED ELEMENTS

10. Hand tool
12. Metal frame
14. hand grip
16. Clamping frame
18. Left edge
20. Right edge
22. Rear edge
24. Firehose opening
26. rounded edges
28. Teeth
30. Bevel
32. Vertical edge on teeth
34. Foot tool
36. Metal frame
38. Foot bracket
40. Vertical side plates
42. Slots
44. Foot strap
46. Clamping frame
48. Left edge
50. Right edge
52. Rear edge
54. Firehose opening
56. Rounded edges
58. Teeth
60. Bevel
62. Vertical edge on teeth

What is claimed is:

1. A firefighter safety system and tool comprising:
a hand tool having a frame wherein on one end of the hand tool there is a hand grip and on the other end of the hand tool there is a firehose clamping frame wherein the hand grip is parallel to the clamping frame and whereby there is an aperture adapted to receive a user's hand and said hand grip is adapted to support the full weight of a user when said clamping frame is engaged upon a firehose and said hand tool has an inner left edge, an inner right edge and an inner rear edge and said inner left edge is parallel to the inner right edge and said inner left edge and said inner right edge are perpendicular to the inner rear edge and whereby there is an opening in the clamping frame opposite of the inner rear edge,
a foot tool having a frame wherein on one end of the foot tool there is a foot bracket and on the other end of the foot tool there is a firehose clamping frame;
vertical side plates located on the foot bracket wherein there is a slot on each said vertical side plate; and
an adjustable foot strap inserted within the slots on said vertical side plates that allows a user to fasten their foot within the foot bracket; and
whereby said clamping frame of the foot tool has an inner left edge, an inner right edge and an inner rear edge and said inner left edge is parallel to the inner right edge and said inner left edge and said inner right edge are perpendicular to the inner rear edge and whereby there is an opening in the clamping frame opposite of the inner rear edge and said clamping frame is flat whereby the inner right edge, the inner left edge and the inner rear edge are in the same plane.

2. The firefighter safety system and tool of claim 1 wherein the adjustable foot strap has a reflective coating.

3. The firefighter safety system and tool of claim 1 wherein the inner left edge, the inner right edge, and the inner rear edge of the clamping frames of both the hand tool and the foot tool have individual teeth along their perimeter.

4. The firefighter safety system and tool of claim 3 wherein the teeth of the hand tool and foot tool are generally triangular in shape and have a bevel on a top surface of said teeth and a bevel on a bottom surface of said teeth.

5. The firefighter safety system and tool of claim 4 wherein on a terminal end of each said teeth said teeth have a vertical edge that is purposed to come into frictional contact with a firehose such that when said clamping frames of said hand tool and foot tool are torqued against the firehose they maintain a firm grip on the firehose and do not damage the firehose because the length of the vertical edge cannot puncture the firehose.

6. The firefighter safety system and tool of claim 3 wherein the teeth are spaced a half inch apart.

7. A firefighter safety tool, comprising:
a hand tool having a frame wherein on one end of the hand tool there is a hand grip and on the other end of the hand tool there is a firehose clamping frame wherein the hand grip is parallel to the clamping frame and whereby there is an aperture adapted to receive a user's hand and said hand grip is adapted to support the full weight of a user when said clamping frame is engaged upon a firehose; wherein the clamping frame of the hand tool has an inner left edge, an inner right edge and an inner rear edge and said inner left edge is parallel to the inner right edge and said inner left edge and said inner right edge are perpendicular to the inner rear edge and whereby there is an opening in the clamping frame opposite of the inner rear edge.

8. The firefighter safety tool of claim 7 wherein the inner left edge, the inner right edge and the rear edge of the clamping frame of the hand tool have individual teeth along their perimeter.

9. The firefighter safety tool of claim 8 wherein the teeth of the hand tool are generally triangular in shape and have a bevel on a top surface of said teeth and a bevel on a bottom surface of said teeth.

10. The firefighter safety tool of claim 9 wherein on a terminal end of each said teeth said teeth have a vertical edge that is purposed to come into frictional contact with a firehose such that when said clamping frame of said hand tool is torqued against the firehose the vertical edge of each teeth keep a firm grip on the firehose and do not damage the firehose because the length of the vertical edge cannot puncture the firehose.

11. The firefighter safety tool of claim 10 wherein the teeth are spaced a half inch apart.

12. A firefighter safety tool, comprising:
a foot tool having a frame wherein on one end of the foot tool there is a foot bracket and on the other end of the foot tool there is a firehose clamping frame;
vertical side plates located on the foot bracket wherein there is a slot on each said vertical side plate;
an adjustable foot strap inserted within the slots on said vertical side plates that allows a user to fasten their foot within the foot bracket; and
whereby said clamping frame of the foot tool has an inner left edge, an inner right edge and an inner rear edge and said inner left edge is parallel to the inner right edge and said inner left edge and said inner right edge are perpendicular to the inner rear edge and whereby there is an opening in the clamping frame opposite of the inner rear edge and said clamping frame is flat whereby the inner right edge, the inner left edge and the inner rear edge are in the same plane.

13. The firefighter safety tool of claim 12 wherein the adjustable foot strap has a reflective coating.

14. The firefighter safety tool of claim 12 wherein the inner left edge, the inner right edge and the inner rear edge of the clamping frame of the foot tool have individual teeth along their perimeter.

15. The firefighter safety tool of claim 14 wherein the teeth on the foot tool are generally triangular in shape and have a bevel on a top surface of said teeth and a bevel on a bottom surface of said teeth.

16. The firefighter safety tool of claim 15 wherein on a terminal end of each said teeth said teeth have a vertical edge that is purposed to come into frictional contact with a firehose such that when said clamping frame of said foot tool are torqued against the firehose they maintain a firm grip on the firehose and do not damage the firehose because the length of the vertical edge cannot puncture the firehose.

17. The firefighter safety tool of claim 16 wherein the teeth are spaced a half inch apart.

\* \* \* \* \*